United States Patent
Faitelson et al.

(10) Patent No.: US 9,641,334 B2
(45) Date of Patent: May 2, 2017

(54) METHOD AND APPARATUS FOR ASCERTAINING DATA ACCESS PERMISSION OF GROUPS OF USERS TO GROUPS OF DATA ELEMENTS

(75) Inventors: Yakov Faitelson, Elkana (IL); Ohad Korkus, Herzeliya (IL); Yzhar Keysar, Kohav-Yair (IL)

(73) Assignee: VARONIS SYSTEMS, INC., New York, NY (US)

( * ) Notice: Subject to any disclaimer, the term of this patent is extended or adjusted under 35 U.S.C. 154(b) by 955 days.

(21) Appl. No.: 12/498,675

(22) Filed: Jul. 7, 2009

(65) Prior Publication Data

US 2011/0010758 A1    Jan. 13, 2011

(51) Int. Cl.
| | |
|---|---|
| H04L 9/32 | (2006.01) |
| G06F 9/46 | (2006.01) |
| G06F 21/62 | (2013.01) |
| H04L 29/06 | (2006.01) |

(52) U.S. Cl.
CPC .............. H04L 9/32 (2013.01); G06F 9/468 (2013.01); G06F 21/6218 (2013.01); H04L 63/104 (2013.01); G06F 2221/2141 (2013.01); H04L 63/101 (2013.01)

(58) Field of Classification Search
USPC .......................................................... 713/201
See application file for complete search history.

(56) References Cited

U.S. PATENT DOCUMENTS

| | | |
|---|---|---|
| 5,465,387 A | 11/1995 | Mukherjee |
| 5,889,952 A | 3/1999 | Hunnicutt et al. |
| 6,178,505 B1 * | 1/2001 | Schneider et al. ............ 713/168 |
| 6,308,173 B1 | 10/2001 | Glasser et al. |
| 6,772,350 B1 | 8/2004 | Belani et al. |
| 6,996,577 B1 * | 2/2006 | Kiran et al. |

(Continued)

FOREIGN PATENT DOCUMENTS

| | | |
|---|---|---|
| CN | 1588889 A | 3/2005 |
| CN | 101753996 | 6/2010 |

OTHER PUBLICATIONS

An International Search Report and a Written Opinion, both dated May 9, 2011, which issued during the prosecution of Applicant's PCT/IL10/01090.

(Continued)

*Primary Examiner* — David Le
(74) *Attorney, Agent, or Firm* — Sughrue Mion, PLLC (57) ABSTRACT

A method for ascertaining access permissions of users to computer resources on a storage unit, the method including grouping users into a plurality of user groups wherein all members of at least one of the user groups have at least nearly identical user/resource access permissions to the computer resources, grouping resources into a plurality of resource groups wherein all members of at least one of the resource groups have at least nearly identical resource/user access permissions, ascertaining whether a given user is a member of a user group, if the given user is a member of a user group, ascribing to the given user the user/resource access permissions of the user group, ascertaining whether a given resource is a member of a resource group, and if the given resource is a member of a resource group, ascribing to the given resource the resource/user access permissions of the resource group.

13 Claims, 9 Drawing Sheets

(56) References Cited

U.S. PATENT DOCUMENTS

| | | | |
|---|---|---|---|
| 7,031,984 B2 | 4/2006 | Kawamura et al. | |
| 7,068,592 B1 | 6/2006 | Duvaut et al. | |
| 7,219,234 B1* | 5/2007 | Ashland et al. | 713/182 |
| 7,716,240 B2 | 5/2010 | Lim | |
| 2002/0026592 A1 | 2/2002 | Gavrila et al. | |
| 2002/0174307 A1* | 11/2002 | Yoshida et al. | 711/152 |
| 2003/0048301 A1 | 3/2003 | Menninger | |
| 2003/0051026 A1 | 3/2003 | Carter et al. | |
| 2003/0229623 A1* | 12/2003 | Chang et al. | 707/3 |
| 2003/0231207 A1 | 12/2003 | Huang | |
| 2004/0249847 A1 | 12/2004 | Wang et al. | |
| 2004/0254919 A1 | 12/2004 | Giuseppini | |
| 2004/0260952 A1* | 12/2004 | Newman et al. | 713/201 |
| 2005/0065823 A1 | 3/2005 | Ramraj et al. | |
| 2005/0086529 A1 | 4/2005 | Buchsbaum | |
| 2005/0097166 A1* | 5/2005 | Patrick et al. | 709/203 |
| 2005/0187937 A1* | 8/2005 | Kawabe et al. | 707/9 |
| 2005/0203881 A1 | 9/2005 | Sakamoto et al. | |
| 2005/0246762 A1 | 11/2005 | Girouard et al. | |
| 2006/0184459 A1 | 8/2006 | Parida | |
| 2006/0277184 A1 | 12/2006 | Faitelson et al. | |
| 2007/0033340 A1 | 2/2007 | Tulskie et al. | |
| 2007/0061487 A1 | 3/2007 | Moore et al. | |
| 2007/0073698 A1 | 3/2007 | Kanayama et al. | |
| 2007/0112743 A1 | 5/2007 | Giampaolo et al. | |
| 2007/0121501 A1* | 5/2007 | Bryson | 370/230 |
| 2007/0156693 A1 | 7/2007 | Soin et al. | |
| 2007/0198608 A1 | 8/2007 | Prahlad et al. | |
| 2007/0203872 A1 | 8/2007 | Flinn et al. | |
| 2007/0244899 A1 | 10/2007 | Faitelson et al. | |
| 2007/0266006 A1 | 11/2007 | Buss | |
| 2007/0276823 A1 | 11/2007 | Borden et al. | |
| 2007/0282855 A1 | 12/2007 | Chen et al. | |
| 2008/0034205 A1 | 2/2008 | Alain et al. | |
| 2008/0091682 A1 | 4/2008 | Lim | |
| 2008/0164846 A1* | 7/2008 | DeKeuster et al. | 320/115 |
| 2008/0172720 A1 | 7/2008 | Botz et al. | |
| 2008/0184330 A1* | 7/2008 | Lal et al. | 726/1 |
| 2008/0271157 A1 | 10/2008 | Faitelson et al. | |
| 2009/0100058 A1 | 4/2009 | Faitelson et al. | |
| 2009/0119298 A1 | 5/2009 | Faitelson et al. | |
| 2009/0150981 A1 | 6/2009 | Amies et al. | |
| 2009/0265780 A1 | 10/2009 | Korkus et al. | |
| 2009/0320088 A1 | 12/2009 | Gill et al. | |
| 2010/0076972 A1* | 3/2010 | Baron et al. | 707/736 |

OTHER PUBLICATIONS

Sahadeb DE et al.: "Secure Access Control in a Multi-user Geodatabase", available on the Internet at URL http://www10.giscafe.com. 2005.

Sara C. Madeira and Arlindo L. Oliveira: "Biclustering Algorithms for Biological Data Analysis: A Survey"; Mar. 2004; http://www.cs.princeton.edu/courses/archive/spr05/cos598E/bib/bicluster.pdf.

Sara C. Madeira: "Clustering, Fuzzy Clustering and Biclustering: An Overview"; p. 31 to 53, Jun. 27, 2003.

An Office Action dated Oct. 31, 2008, which issued during the prosecution of Applicant's U.S. Appl. No. 11/635,736.

An Office Action dated Aug. 1, 2008, which issued during the prosecution of Applicant's U.S. Appl. No. 11/258,256.

An Office Action dated Feb. 12, 2008, which issued during the prosecution of Applicant's U.S. Appl. No. 11/258,256.

An Office Action dated Dec. 14, 2010, which issued during the prosecution of Applicant's U.S. Appl. No. 11/789,884.

An Office Action dated Dec. 14, 2010, which issued during the prosecution of Applicant's U.S. Appl. No. 11/786,522.

An Office Action dated Jul. 9, 2010, which issued during the prosecution of Applicant's U.S. Appl. No. 11/789,884.

An International Search Report and a Written Opinion, both dated May 20, 2010, which issued during the prosecution of Applicant's PCT/IL10/00069.

An Office Action dated Sep. 14, 2012, which issued during the prosecution of U.S. Appl. No. 12/861,967.

U.S. Appl. No. 61/240,726, filed Sep. 9, 2009.

U.S. Appl. No. 12/673,691, filed Jan. 27, 2010.

An International Search Report and a Written Opinion both dated Jun. 14, 2011 which issued during the prosecution of Applicant's PCT/IL11/00066.

An International Search Report and a Written Opinion both dated May 24, 2011 which issued during the prosecution of Applicant's PCT/IL11/00077.

An English Translation of an Office Action dated Apr. 21, 2016 which issued during the prosecution of Chinese Patent Application No. 201080071011.9.

An English Translation of an Office Action dated Nov. 3, 2015 which issued during the prosecution of Chinese Patent Application No. 201080071011.9.

* cited by examiner

METHOD AND APPARATUS FOR ASCERTAINING DATA ACCESS PERMISSION OF GROUPS OF USERS TO GROUPS OF DATA ELEMENTS

FIELD OF THE INVENTION

The present invention relates to data security generally and more particularly to data security in large organizations having a large number of resources and a large number of users.

BACKGROUND OF THE INVENTION

The following U.S. Patents are believed to represent the current state of the art: U.S. Pat. Nos. 6,772,350; 6,308,173 and 5,889,952.

SUMMARY OF THE INVENTION

The present invention seeks to provide methodology and a system for ascertaining access permissions of users to computer resources in a large organization having a large number of resources and a large number of users.

There is thus provided ill accordance with a preferred embodiment of the present invention a method for ascertaining access permissions of a first multiplicity of users to a second multiplicity of computer resources on at least one storage unit, the method including:

grouping users, among the first multiplicity of users, into a first plurality of groups wherein all members of at least one of the first plurality of groups have at least nearly identical user/resource access permissions to the second multiplicity of computer resources on the at least one storage unit, grouping resources, among the second multiplicity of computer resources, into a second plurality of groups wherein all members of at least one of the second plurality of groups have at least nearly identical resource/user access permissions, ascertaining whether a given user is a member of one of the first plurality of groups, if the given user is a member of the one of the first plurality of groups, ascribing to the given user the user/resource access permissions of the one of the first plurality of groups, ascertaining whether a given resource is a member of one of the second plurality of groups, and if the given resource is a member of the one of the second plurality of groups, ascribing to the given resource the resource/user access permissions of the one of the second plurality of groups.

In accordance with a preferred embodiment of the present invention the grouping users includes identifying a set of user security groups, each of the user security groups having access permissions to at least one of the second multiplicity of computer resources on the at least one storage unit, identifying, for each user of the first multiplicity of users, a subset of the user security groups of which the user is a member, and if a first subset of the user security groups, of which a first user of the first multiplicity of users is a member, is identical to a second subset of the user security groups, of which a second user of the first multiplicity of users is a member, grouping the first user and the second user in a single one of the first plurality of groups with respect to the at least one storage unit.

In accordance with a further preferred embodiment of the present invention the grouping users includes dividing the second multiplicity of computer resources into at least two portions, and grouping the users, among the first multiplicity of users, into the first plurality of groups wherein all members of one of the first plurality of groups have at least nearly identical user/resource access permissions to computer resources included in one of the at least two portions.

In accordance with another preferred embodiment of the present invention the dividing includes for each user of the first multiplicity of users, calculating a fraction of the second multiplicity of computer resources to which the user has access permissions, and comparing the fraction to a threshold value, denoting each user, for whom the fraction is smaller than the threshold value, as a degenerate security group, and defining a first portion of the second multiplicity of computer resources to be the union of all computer resources which include access permissions for any degenerate security group.

In accordance with another preferred embodiment of the present invention, computer resources in the second multiplicity of computer resources are arranged in a computer resource hierarchy. Preferably, the grouping resources includes for each resource in the computer resource hierarchy, retrieving the resource/user access permissions of the resource and the resource/user access permissions of an immediate ancestor of the resource in the computer resource hierarchy, and if the resource/user access permissions of the immediate ancestor are identical to the resource/user access permissions of the resource, grouping the resource and the immediate ancestor in a single one of the second plurality of groups. Additionally or alternatively, the grouping the resource includes providing a pointer from the resource to the immediate ancestor and extending pointers which point to the resource to point to the immediate ancestor.

There is additionally provided, in accordance with another preferred embodiment of the present invention, a method for ascertaining access permissions of a first multiplicity of users to a second multiplicity of computer resources on at least one storage unit, the method including grouping users, among the first multiplicity of users, into a first plurality of groups wherein all members of at least one of the first plurality of groups have at least nearly identical user/resource access permissions to the second multiplicity of computer resources on the at least one storage unit, ascertaining whether a given user is a member of one of the first plurality of groups, and if the given user is a member of the one of the first plurality of groups, ascribing to the given user the user/resource access permissions of the one of the first plurality of groups.

In accordance with a preferred embodiment of the present invention the grouping users includes identifying a set of user security groups, each of the user security groups having access permissions to at least one of the second multiplicity of computer resources on the at least one storage unit, identifying, for each of the first multiplicity of users, a subset of the user security groups of which the user is a member, and if a first subset of the user security groups, of which a first user of the first multiplicity of users is a member, is identical to a second subset of the user security groups, of which a second user of the first multiplicity of users is a member, grouping the first user and the second user in a single one of the first plurality of groups with respect to the at least one storage unit.

In accordance with another preferred embodiment of the present invention the grouping users includes dividing the second multiplicity of computer resources into at least two portions, and grouping the users, among the first multiplicity of users, into the first plurality of groups wherein all members of one of the first plurality of groups have at least nearly identical user/resource access permissions to computer resources included in one of the at least two portions. Preferably, the dividing includes for each user of the first multiplicity of users, calculating a fraction of the second multiplicity of computer resources to which the user has access permissions, and comparing the fraction to a threshold value, denoting each user, for whom the fraction is smaller than the threshold value, as a degenerate security group, and defining a first portion of the second multiplicity of computer resources to be the union of all computer resources which include access permissions for any degenerate security group.

There is additionally provided, in accordance with an additional preferred embodiment of the present invention, a method for ascertaining access permissions of a first multiplicity of users to a second multiplicity of computer resources on at least one storage unit, the method including grouping resources, among the second multiplicity of computer resources, into a plurality of groups wherein all members of at least one of the plurality of groups have at least nearly identical resource/user access permissions, ascertaining whether a given resource is a member of one of the plurality of groups, and if the given resource is a member of the one of the plurality of groups, ascribing to the given resource the resource/user access permissions of the one of the plurality of groups.

In accordance with a preferred embodiment of the present invention, the computer resources in the second multiplicity of computer resources are arranged in a computer resource hierarchy. Preferably, the grouping resources includes for each resource in the computer resource hierarchy, retrieving the resource/user access permissions of the resource and the resource/user access permissions of an immediate ancestor of the resource in the computer resource hierarchy, and if the resource/user access permissions of the immediate ancestor are identical to the resource/user access permissions of the resource, grouping the resource and the immediate ancestor in a single one of the second plurality of groups.

In accordance with a further preferred embodiment of the present invention the grouping the resource includes providing a pointer from the resource to the immediate ancestor and extending pointers, which point to the resource to point to the immediate ancestor.

There is further provided in accordance with a yet another preferred embodiment of the present invention apparatus for ascertaining access permissions of a first multiplicity of users to a second multiplicity of computer resources on at least one storage unit, the apparatus including:

user grouping functionality operative to group users, among the first multiplicity of users, into a first plurality of groups wherein all members of at least one of the first plurality of groups have at least nearly identical user/resource access permissions to the second multiplicity of computer resources on the at least one storage unit, computer resource grouping functionality operative to group computer resources, among the second multiplicity of computer resources, into a second plurality of groups wherein all members of at least one of the second plurality of groups have at least nearly identical resource/user access permissions, user access permissions ascribing functionality operative to ascertain whether a given user is a member of one of the first plurality of groups, and if the given user is a member of the one of the first plurality of groups, to ascribe to the given user the user/resource access permissions of the one of the first plurality of groups, and computer resource access permissions ascribing functionality operative to ascertain whether a given computer resource is a member of one of the second plurality of groups, and if the given computer resource is a member of the one of the second plurality of groups, to ascribe to the given computer resource the resource/user access permissions of the one of the second plurality of groups.

In accordance with a preferred embodiment of the present invention the user grouping functionality includes user security group identification functionality operative to identify a plurality of user security groups, each of the user security groups having access permissions to at least one of the second multiplicity of computer resources on the at least one storage unit, user security group subset identification functionality operative to identify, for each of the first multiplicity of users, a subset of the user security groups of which the user is a member, and user subset comparison functionality operative to group a first user and a second user in a single one of the first plurality of groups, with respect to the at least one storage unit, if a first subset of the user security groups of which the first user is a member is identical to a second subset of the user security groups of which the second user is a member.

In accordance with a further preferred embodiment of the present invention the apparatus also includes a computer resource dividing functionality operative to divide the second multiplicity of computer resources into at least two portions, and wherein the user grouping functionality is operative to group users, among the first multiplicity of users, into the first plurality of groups wherein all members of one of the first plurality of groups have at least nearly identical user/resource access permissions to computer resources included in one of the at least two portions.

In accordance with another preferred embodiment of the present invention the computer resource dividing functionality includes fraction calculating functionality operative, for each user of the first multiplicity of users, to calculate a fraction of the second multiplicity of computer resources to which the user has access permissions, and to compare the fraction to a threshold value, user denoting functionality operative to denote each user, for whom the fraction is smaller than the threshold value, as a degenerate security group, and portion defining functionality operative to define a first portion of the second multiplicity of computer resources to be the union of all computer resources which include access permissions for any degenerate security group. Preferably, computer resources in the second multiplicity of computer resources are arranged in a computer resource hierarchy.

In accordance with another preferred embodiment of the present invention the computer resource grouping functionality includes resource/user access permissions retrieval functionality operative, for each resource in the computer resource hierarchy, to retrieve the resource/user access permissions of the resource and the resource/user access permissions of an immediate ancestor of the resource in the computer resource hierarchy and resource/user access permissions comparison functionality, operative to compare the resource/user access permissions of the resource to the resource/user access permissions of the immediate ancestor, and if the resource/user access permissions of the immediate ancestor are identical to the resource/user access permissions of the given resource, to group the resource and the immediate ancestor in a single one of the second plurality of groups.

In accordance with another preferred embodiment of the present invention the resource/user access permissions comparison functionality is operative to provide a pointer from the resource to the immediate ancestor and to extend pointers which point to the resource to point to the immediate ancestor.

There is additionally provided, in accordance with still another preferred embodiment of the present invention, apparatus for ascertaining access permissions of a first multiplicity of users to a second multiplicity of computer resources on at least one storage unit, the apparatus including user grouping functionality operative to group users, among the first multiplicity of users, into a first plurality of groups wherein all members of at least one of the first plurality of groups have at least nearly identical user/resource access permissions to the second multiplicity of computer resources on the at least one storage unit, and user access permissions ascribing functionality operative to ascertain whether a given user is a member of one of the first plurality of groups, and if the given user is a member of the one of the first plurality of groups, to ascribe to the given user the user/resource access permissions of the one of the first plurality of groups.

In accordance with a preferred embodiment of the present invention the user grouping functionality includes user security group identification functionality operative to identify a plurality of user security groups, each of the user security groups having access permissions to at least one of the second multiplicity of computer resources on the at least one storage unit, user security group subset identification functionality operative to identify, for each of the first multiplicity of users, a subset of the user security groups of which the user is a member, and user subset comparison functionality operative to group a first user and a second user in a single one of the first plurality of groups, with respect to the at least one storage unit, if a first subset of the user security groups of which the first user is a member is identical to a second subset of the user security groups of which the second user is a member.

In accordance with another preferred embodiment of the present invention the apparatus also includes a computer resource dividing functionality operative to divide the second multiplicity of computer resources into at least two portions, and wherein the user grouping functionality is operative to group users, among the first multiplicity of users, into the first plurality of groups wherein all members of one of the first plurality of groups have at least nearly identical user/resource access permissions to computer resources included in one of the at least two portions. Preferably, the computer resource dividing functionality includes fraction calculating functionality operative, for each user of the first multiplicity of users, to calculate a fraction of the second multiplicity of computer resources to which the user has access permissions, and to compare the fraction to a threshold value, user denoting functionality operative to denote each user, for whom the fraction is smaller than the threshold value, as a degenerate security group, and portion defining functionality operative to define a first portion of the second multiplicity of computer resources to be the union of all computer resources which include access permissions for any degenerate security group.

There is additionally provided, in accordance with an additional preferred embodiment of the present invention, apparatus for ascertaining access permissions of a first multiplicity of users to a second multiplicity of computer resources on at least one storage unit, the apparatus including computer resource grouping functionality operative to group resources, among the second multiplicity of computer resources, into a second plurality of groups wherein all members of at least one of the second plurality of groups have at least nearly identical resource/user access permissions, and computer resource access permissions ascribing functionality operative to ascertain whether a given computer resource is a member of one of the second plurality of groups, and if the given computer resource is a member of the one of the second plurality of groups, to ascribe to the given computer resource the resource/user access permissions of the one of the second plurality of groups. Preferably, computer resources in the second multiplicity of computer resources are arranged in a computer resource hierarchy.

In accordance with a preferred embodiment of the present invention the computer resource grouping functionality includes resource/user access permissions retrieval functionality operative, for each resource in the computer resource hierarchy, to retrieve the resource/user access permissions of the resource and the resource/user access permissions of an immediate ancestor of the resource in the computer resource hierarchy and resource/user access permissions comparison functionality, operative to compare the resource/user access permissions of the resource to the resource/user access permissions of the immediate ancestor, and if the resource/user access permissions of the immediate ancestor are identical to the resource/user access permissions of the resource, to group the resource and the immediate ancestor in a single one of the second plurality of groups.

In accordance with another preferred embodiment of the present invention the resource/user access permissions comparison functionality is operative to provide a pointer from the resource to the immediate ancestor and to extend pointers which point to the resource to point to the immediate ancestor.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Data security policies typically determine who has access to an organization's data, which data is typically stored on various computer systems. These policies are rarely static. This is partly because users from within the organization, such as employees, partners and contractors, can pose a threat to sensitive data as severe as threats from outside the organization. Thus, as the structure and personnel makeup of the organization change, the security policy should be adjusted accordingly. Information technology departments often find it difficult to manage user data access permissions and to ensure that required information is conveniently available, while protecting the organization's sensitive data.

Large business organizations may operate computer systems comprising large numbers of servers, which are often geographically distributed. Storage elements in such systems may be accessible by a large numbers of users. Various people associated with data access authorizations, including information technology personnel, operational personnel such as account managers and third party reviewers such as legal advisors may need to routinely inquire as to user access permissions to specific data.

Maintenance of a conventional localized or distributed database suitable for responding to queries as to the access permissions of any particular user or group of users, or conversely, for responding to queries as to the access permissions relating to a particular storage element or group of storage elements, could overwhelm the capabilities of even the most sophisticated database management programs currently existing. Storage and retrieval of the data required in order to service such queries may have an adverse affect on the storage capacities of various servers. Additionally, execution of such queries may impact the performance of the servers and thus may impair the overall efficiency of the computer system. Furthermore, because processing a response to such queries often necessitates an exhaustive iterative search through the directories of many file servers and their access control lists, the time for responding to such queries becomes unacceptably long.

Access control technologies have not been optimally implemented in systems that utilize diverse access control models. The state of the art today is such that there is no easy way for system administrators to know which users are authorized to access each specific data item in such environments. As a result, in many organizations an unacceptably high number of users have inappropriate access permissions. A solution is also lacking for tie related problems of redundant access permissions and of orphan accounts belonging to personnel who no longer belong to the organization. Hence, there is a need for improvements in controlling user access permissions in order to improve data security, prevent fraud, and improve company productivity. Furthermore, misuse of data access permissions, even by authorized users, is a concern for those charged with simplification and automation of system security.

Figure 1:
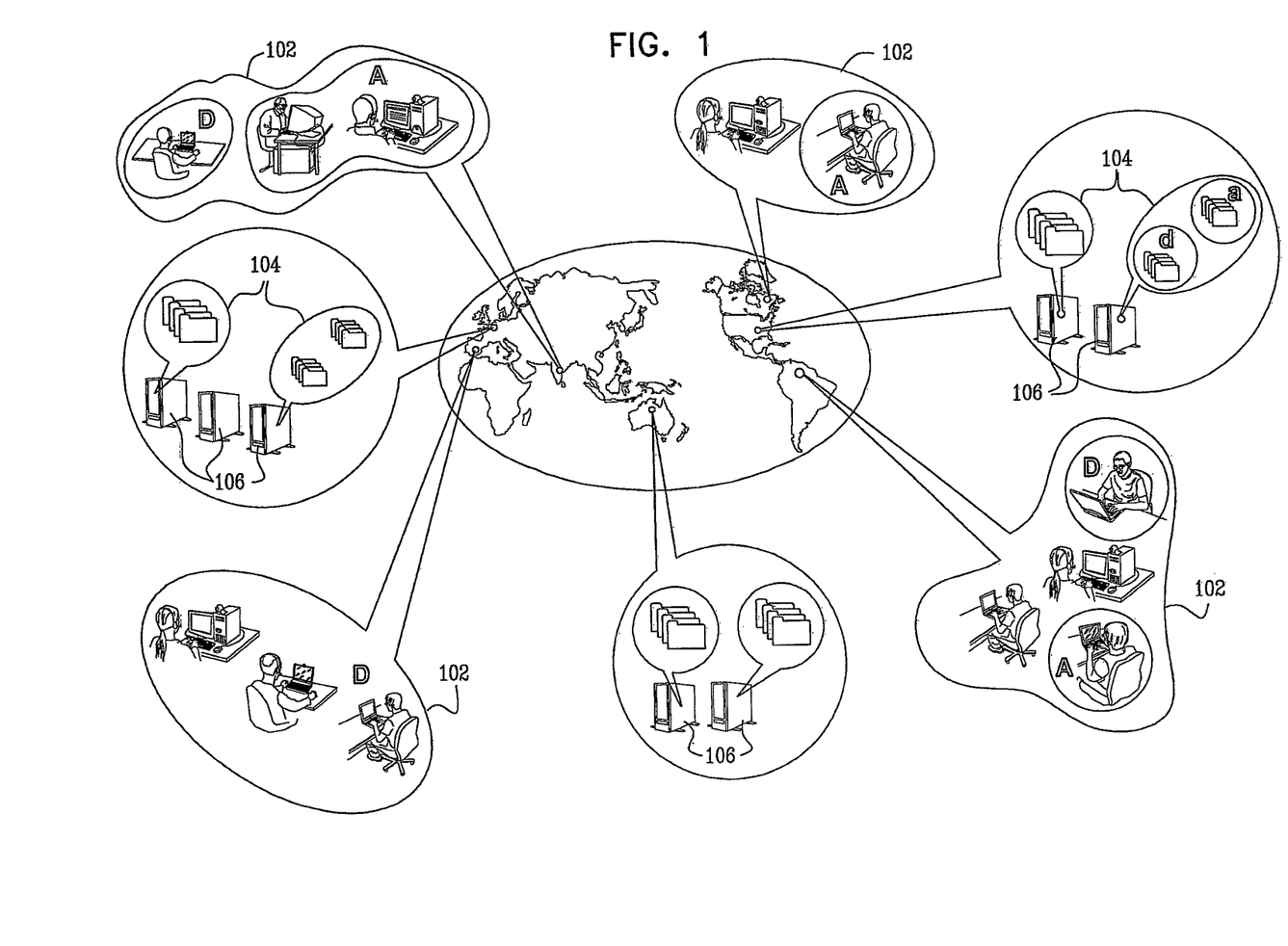
FIG. 1 is a simplified illustration of operation of a preferred embodiment of the present invention in a large organization having a large number of resources and a large number of users.

Referring now to FIG. 1, there is seen a schematic representation of a large organization having a first multiplicity of users and a second multiplicity of computer resources, such as computer files, which may reside on many file servers. The users and the file servers may be geographically distributed independently of their function. In accordance with a preferred embodiment of the present invention, a hierarchical structure of the second multiplicity of computer resources, and/or a grouping of the first multiplicity of users in accordance with their access permissions with respect to computer resources residing on a specific server, are employed when responding to access permission queries, thereby allowing for better response times to such queries.

With respect to a given user, the term "user/resource access permissions" relates to a list of computer resources, located on a specific server or storage unit, to which the given user has access permissions. Thus, two users have identical user/resource access permissions if, with respect to a specific server or storage unit, both users have access permissions to an identical list of computer resources located on that server or storage unit.

With respect to a given computer resource, the term "resource/user access permissions" relates to a list of users with access permissions to the given computer resource. Thus, two computer resources have identical resource/user access permissions if an identical list of users has access permissions to both computer resources.

It is further appreciated that in the context of the present invention the term "access permissions" relates to reading permissions, writing permissions and executing permissions, or any combination thereof. For example, a given user has access permissions to a given resource if the user has reading permissions to the given resource, even if the user does not have writing permissions or executing permissions to the given resource.

In accordance with a preferred embodiment of the present invention, as seen in FIG. 1, there is provided a method for ascertaining access permissions of the first multiplicity of users, indicated generally by reference numeral 102, to the second multiplicity of computer resources, indicated generally by reference numeral 104, on at least one storage unit, preferably a plurality of file servers, indicated generally by reference numeral 106.

Preferably among the first multiplicity of users 102, a first plurality of groups of users is defined, wherein all members of each one of the first plurality of groups of users have at least nearly identical user/resource access permissions to the computer resources on a given file server 106.

For example, as seen in FIG. 1, personnel in the accounting department, whether located in India, Brazil or Canada, may be members of the same user group, here designated by the letter A. Similarly, development engineers in the R&D department, whether located in Spain, Brazil or India, may be members of the same user group, here designated by the letter D.

In parallel, among the second multiplicity of computer resources, a second plurality of groups of computer resources is defined, wherein all members of each one of the second plurality of groups of computer resources have at least nearly identical resource/user access permissions, for example each computer file in a given group is accessible by an identical or nearly identical group of users.

For example, as seen in FIG. 1, all files relating to accounts payable may be members of the same computer resource group, here designated by the letter 'a'. Similarly, all files relating to development of a door may be members of the same computer resource group, here designated by the letter 'd'.

It is appreciated that all members of each user group have at least nearly identical user/resource access permission profiles. For example, all members of user group A have access to the company's accounts and all members of user group D have access to the engineering files.

Similarly, it is appreciated that all members of each computer resource group have at least nearly identical resource/user access permission profiles, for example all members of computer resource group 'a' are accessible by bookkeepers and all members of computer resource group 'd' are accessible by design engineers.

In order to respond to a query or otherwise prepare a report indicating access permission profiles for certain users or computer resources, it is possible to quickly ascertain whether a given user is a member of one of the first plurality of user groups, and if so, to quickly ascribe to that given user the user/resource access permissions of that one of the first plurality of user groups. Similarly it is possible to quickly ascertain whether a given computer resource is a member of one of the second plurality of computer resource groups, and if so, to quickly ascribe to that given computer resource the resource/user access permissions of that one of the second plurality of computer resource groups.

Thus the time consuming iterative processing employed in the prior art is obviated.

It is appreciated that embodiments of the invention, which only group either users or computer resources, but not both, are also within the scope of the present invention.

Methodology for carrying out the foregoing steps in accordance with a preferred embodiment of the present invention will now be described, with reference to FIG. 2.

Figure 2:
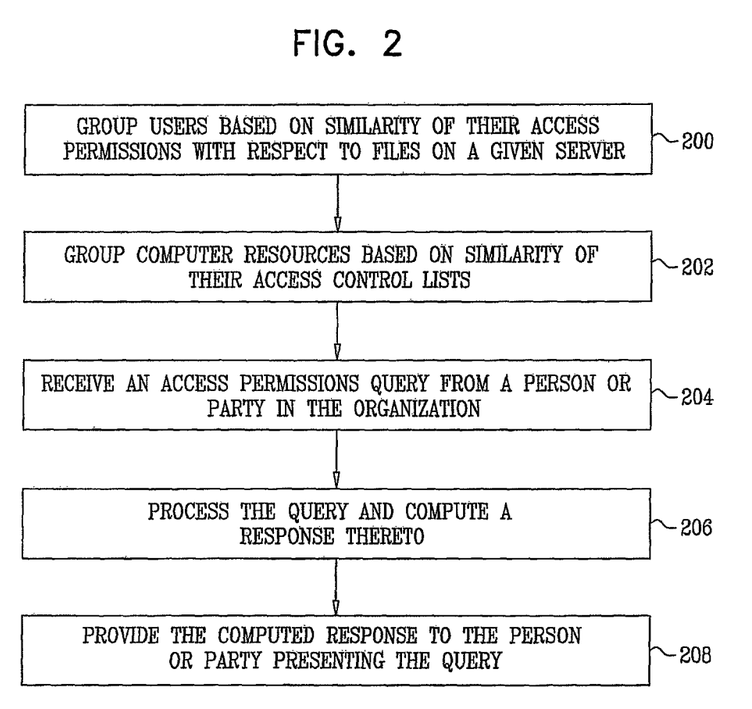
FIG. 2 is a simplified flowchart illustrating general methodology for ascertaining access permissions of users to computer resources in a large organization having a large number of resources and a large number of users in accordance with a preferred embodiment of the present invention.

Reference is now made to FIG. 2, which is a simplified flowchart illustrating general methodology for ascertaining access permissions of users to computer resources in a large organization having a large number of resources and a large number of users in accordance with a preferred embodiment of the present invention.

As seen in FIG. 2, in a first preparatory stage, users in the organization are divided into groups based on their access permissions with respect to a given server in the organization, as seen at step 200. Specifically, for each server, users in the organization are divided into a plurality of user groups, wherein users in each group have similar or preferably identical access permissions with respect to files in the server. The methodology for grouping the users is described in further detail hereinbelow with reference to FIG. 3.

As seen at step 202, in a second preparatory stage, the computer resources of the organization are grouped based on the access permissions thereto. Specifically, in a hierarchical server system, unless otherwise specified, a computer resource has the same access permissions as the direct ancestor thereof. Thus, computer resources may be grouped such that each descendant computer resource, which has access permissions identical to those of its ancestor computer resource, points to the access control list of its ancestor, rather than duplicating that access control list. The methodology for grouping the computer resources is described in further detail hereinbelow with reference to FIG. 4.

It is appreciated that the grouping of users of step 200 and grouping of computer resources of step 202 may be carried out in any sequence, or in parallel, and preferably is performed periodically, in order to account for changes in user access permissions and/or in the hierarchical structure of the computer resources in the organization.

In a first processing stage, which follows the preparatory stages described hereinabove, an access permissions query is presented, typically by a member of the organization or a department thereof, as seen at step 204. A typical query would comprise a subset of users and a subset of storage elements. A response to such a query would list, for each user in the subset of users, access permissions to each of the storage elements in the subset of storage elements.

For example, one query may include all the users in the organization as the user subset, and a given computer resource as the storage element subset. A response to this query would identify all the users who have permission to access the given computer resource. In another example, the query may include all of the computer resources of the organization as the storage element subset, and a given user as the user subset. A response to this query would identify all the storage elements, which may be accessed by the given user.

As seen at step 206, the query is processed and a response thereto is computed. Typically, the response to the query includes, for each user listed in the query, a list of a sub-group of the computer resources listed in the query to which the user has access. The methodology for computing the response to the query is described in further detail hereinbelow with reference to FIG. 5. The response to the query is then forwarded to the person or patty who presented the access permissions query, indicated as step 208.

Figure 3A:
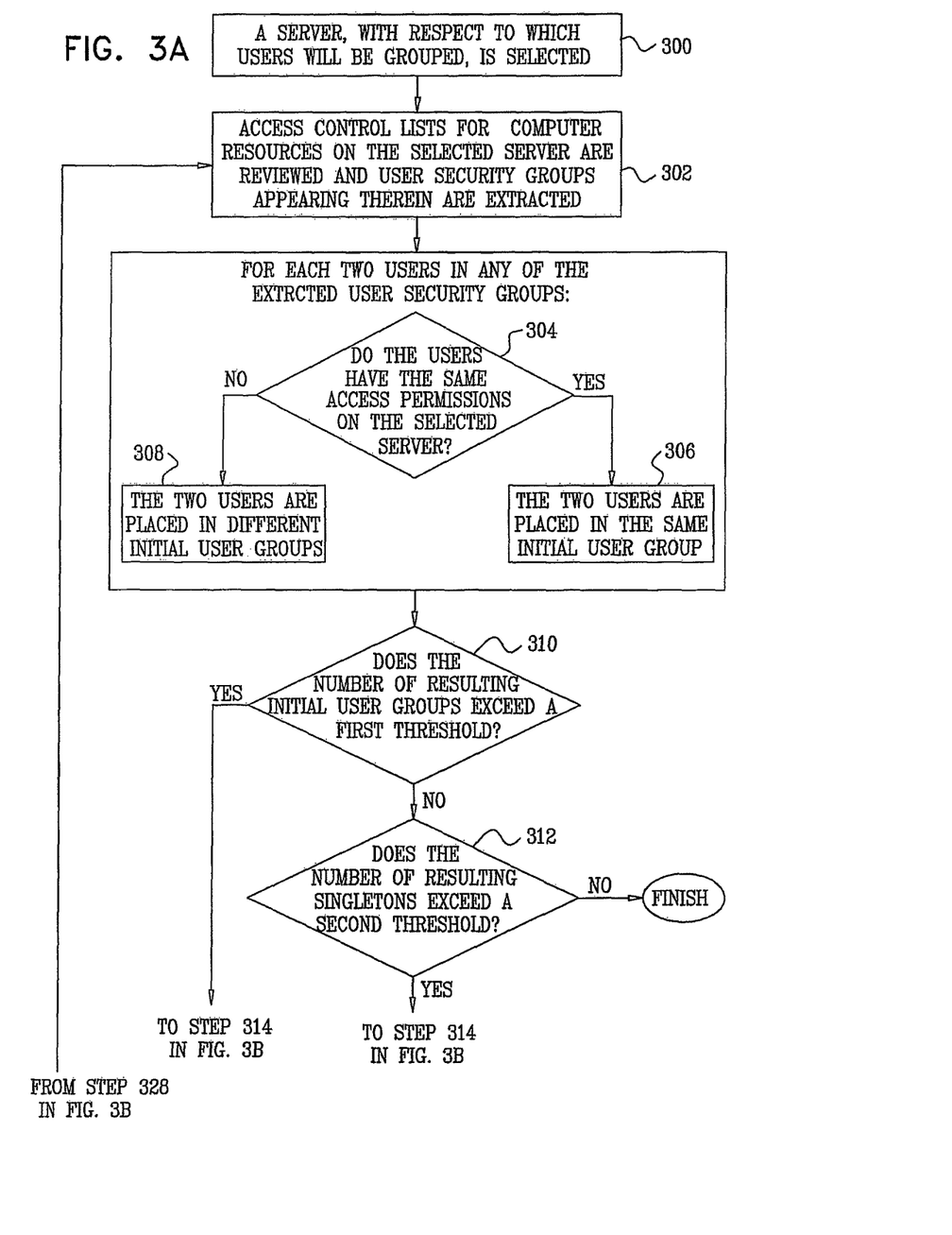
FIGS. 3A and 3B, taken together, are a simplified flowchart illustrating methodology for grouping users in a large organization based on their access permissions, which methodology forms part of the methodology of FIG. 2.
Figure 3B:
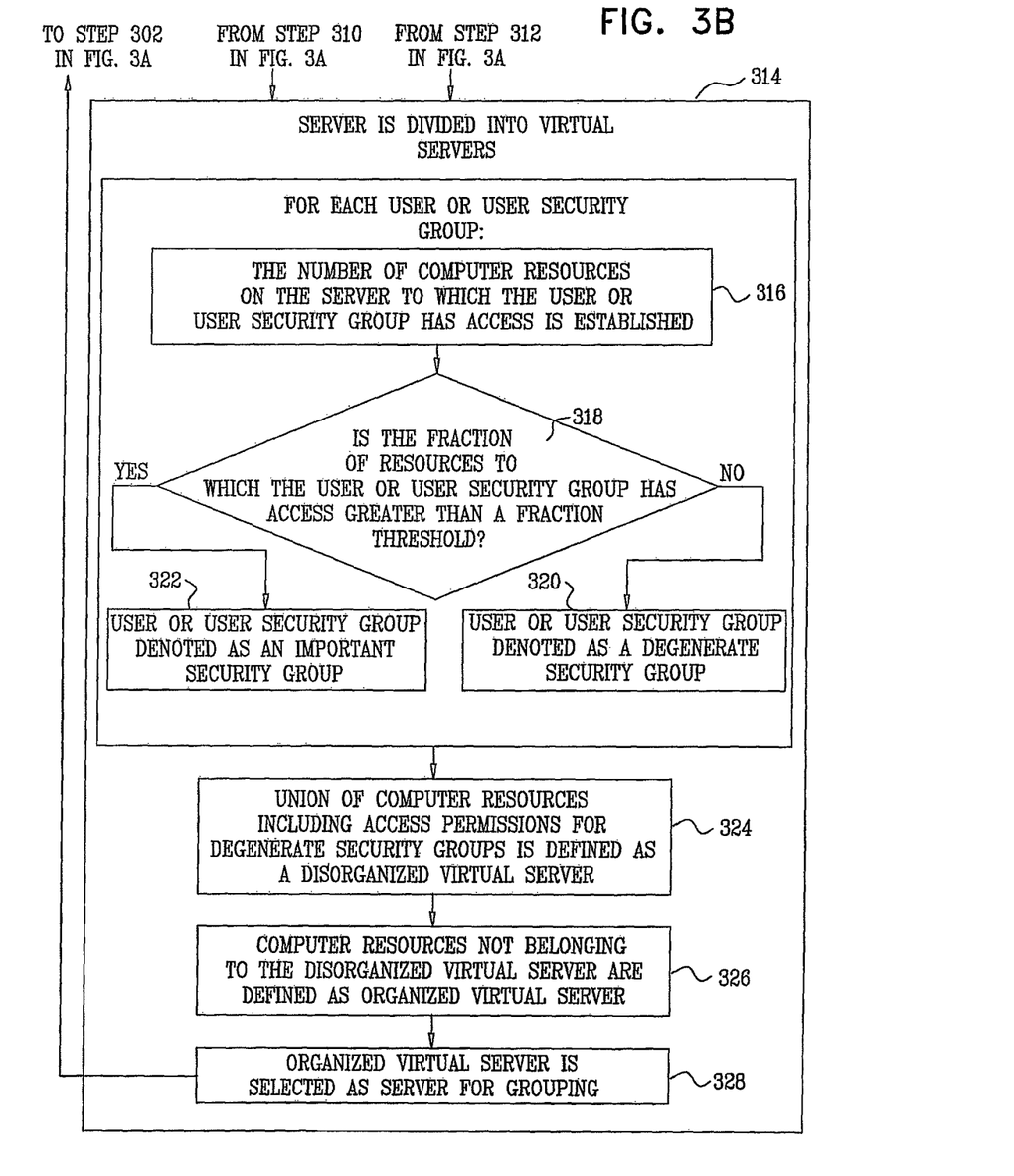

Reference is now made to FIGS. 3A and 3B, which, when taken together, are a simplified flowchart illustrating methodology for grouping users in a large organization based on their access permissions, which methodology constitutes the first preparatory stage 200 of the methodology of FIG. 2. The goal of such grouping is to create user groups, wherein users in a single user group have similar, or preferably identical, access permissions with respect to computer resources stored on a given server.

A prerequisite for the creation of such user groups is the definition of user security groups, which is carried out prior to first step 300 of FIG. 3A. User security groups are pre-defined by the system administrator. Typically, user security groups correspond to different departments within the organization. User security groups may include, for example, an accounting user security group, a research and development user security group, etc. Each respective user security group includes those users who belong to the department to which the user security group corresponds. Users may belong to more than one user security group. For example, the secretary of a research and development department may belong to an administrative user security group and a research and development user security group.

Each user security group has pre-assigned access permissions to computer resources on a given server. An access control list for a given computer resource is a list of user security group access permissions to that computer resource.

As seen in FIG. 3A, a server is selected, as seen at step 300. It is appreciated that the users will be grouped only with respect to their access permissions to computer resources residing on the selected server.

Subsequently, the access control list for computer resources which reside on the selected server is reviewed, in order to extract those user security groups, and hence those users belonging to those user security groups, with permission to access at least some of the computer resources stored on the server, as seen at step 302.

For any given pair of users listed belonging to any of the extracted user security groups, the users' access permissions to computer resources stored on the selected server are compared to check whether they are identical with respect to all computer resources stored on the selected server as seen at decision step 304. If both users in the pair have identical access permissions to computer resources stored on the selected server they are assigned to the same initial user group with respect to the selected server, as seen at step 306. Otherwise, they are assigned to two different initial user groups with respect to the selected server, as seen at step 308.

These initial user groups are pre-runners of the user groups that this methodology seeks to create. The initial user groups may require further refinement, as described below, to arrive at the desired final user groups. It is appreciated that two users may have very similar access permissions on the selected server, other than one or two specific computer resources to which their access permissions differ. This may happen, for example, when the server includes some users' home directories, in which case two users could have identical access permissions to all computer resources in the server other than the home directories, for which each user would have access permission to his or her own specific home directory, but would generally not have access permission to other users' home directories.

This situation may cause the server to be grouped into many small initial user groups or even singletons, even though there are larger potential initial user groups with very similar, although not identical, access permissions. As will be described hereinbelow, this situation may be overcome by virtually dividing the computer resources on the server into two or more virtual servers.

Therefore, following user assignment to initial user groups as seen in steps 304, 306 and 308, the number of resulting initial user groups and the sizes thereof are reviewed. Preferably, the number of initial user groups is compared to a first predetermined threshold number, as seen at decision step 310, and the number of singleton initial user groups is compared to a second predetermined threshold number, as seen at decision step 312. If the number of initial user groups does not exceed the first threshold number and if the number of singleton initial user groups does not exceed the second threshold number the user assignment is complete. The initial user groups and singletons now constitute user groups, as referred to above, specifically in reference to step 200 of FIG. 2.

Turning to FIG. 3B, it is seen that if the number of initial user groups exceeds the first threshold number, and/or if the number of singleton initial user groups exceeds the second threshold number, the server is divided into two virtual servers, as seen at step 314. In accordance with one exemplary embodiment for carrying out such a virtual division of the server, for each specific user or user security group, the number of computer resources stored on the server to which the specific user or user security group is permitted access is established, as seen at step 316. The fraction of computer resources to which the specific user or user security group is permitted access is then calculated and compared to a fraction threshold value, such as 1%, as seen at decision step 318.

If the fraction of computer resources to which a specific user or user security group is permitted access is smaller than the fraction threshold value, the user or user security group is denoted as a degenerate security group, as seen at step 320. Otherwise, the user or user security group is denoted as an important security group, as seen at step 322.

The union of computer resources including access permissions for the degenerate security groups is defined as one virtual server, denoted a disorganized virtual server, as seen at step 324. The disorganized virtual server is assumed to include few computer resources with similar access control lists and/or few users with identical access permissions. Assignment of users to initial user groups based on the computer resources in the disorganized virtual server is likely to result in a large number of initial user groups and/or singleton initial user groups and is inefficient and therefore unnecessary.

The computer resources on the server which do not belong to the disorganized virtual server are defined as a second virtual server, denoted an organized virtual server, as seen at step 326. The organized virtual server is assumed to include files with similar access control lists, such that assignment of users to initial user groups based on their access permissions to computer resources in this virtual server is likely to result in a small number of organized initial user groups.

Following the division of the server into two virtual servers, the organized virtual server is selected as the server with respect to which users will be assigned to initial user groups, as seen at step 328. Subsequently, users are assigned to initial user groups again based on their access permissions to computer resources stored on the organized virtual server, as described hereinabove with reference to steps 302 to 308. These initial user groups and singleton initial user groups now constitute user groups, as referred to above, specifically in reference to step 200 of FIG. 2.

Figure 4A:
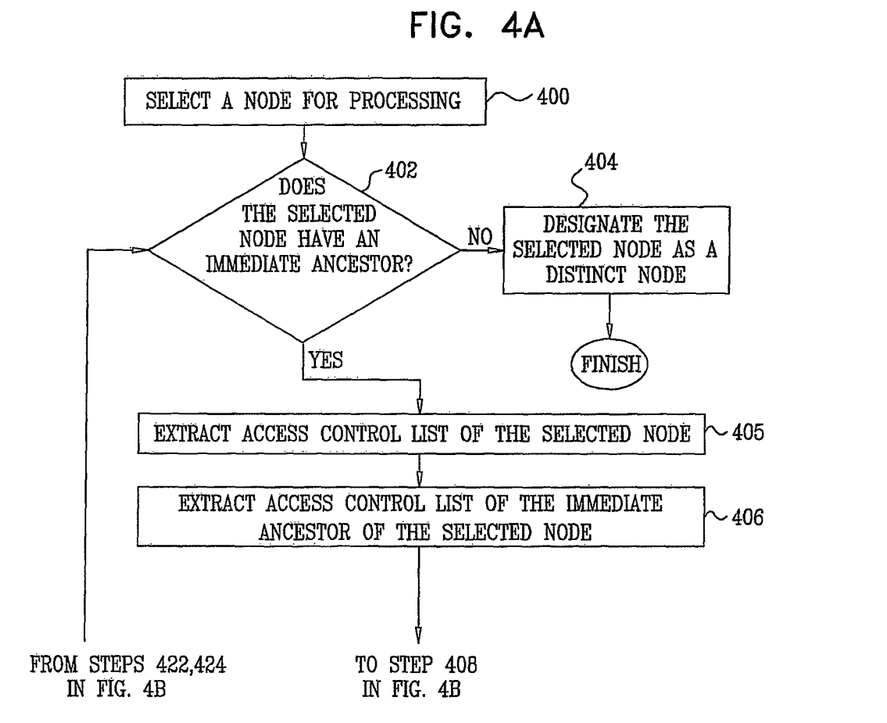
FIGS. 4A and 4B, taken together, are a simplified flowchart illustrating methodology for grouping computer resources in a large organization based on the access permissions to the computer resources, which methodology forms part of the methodology of FIG. 2.
Figure 4B:
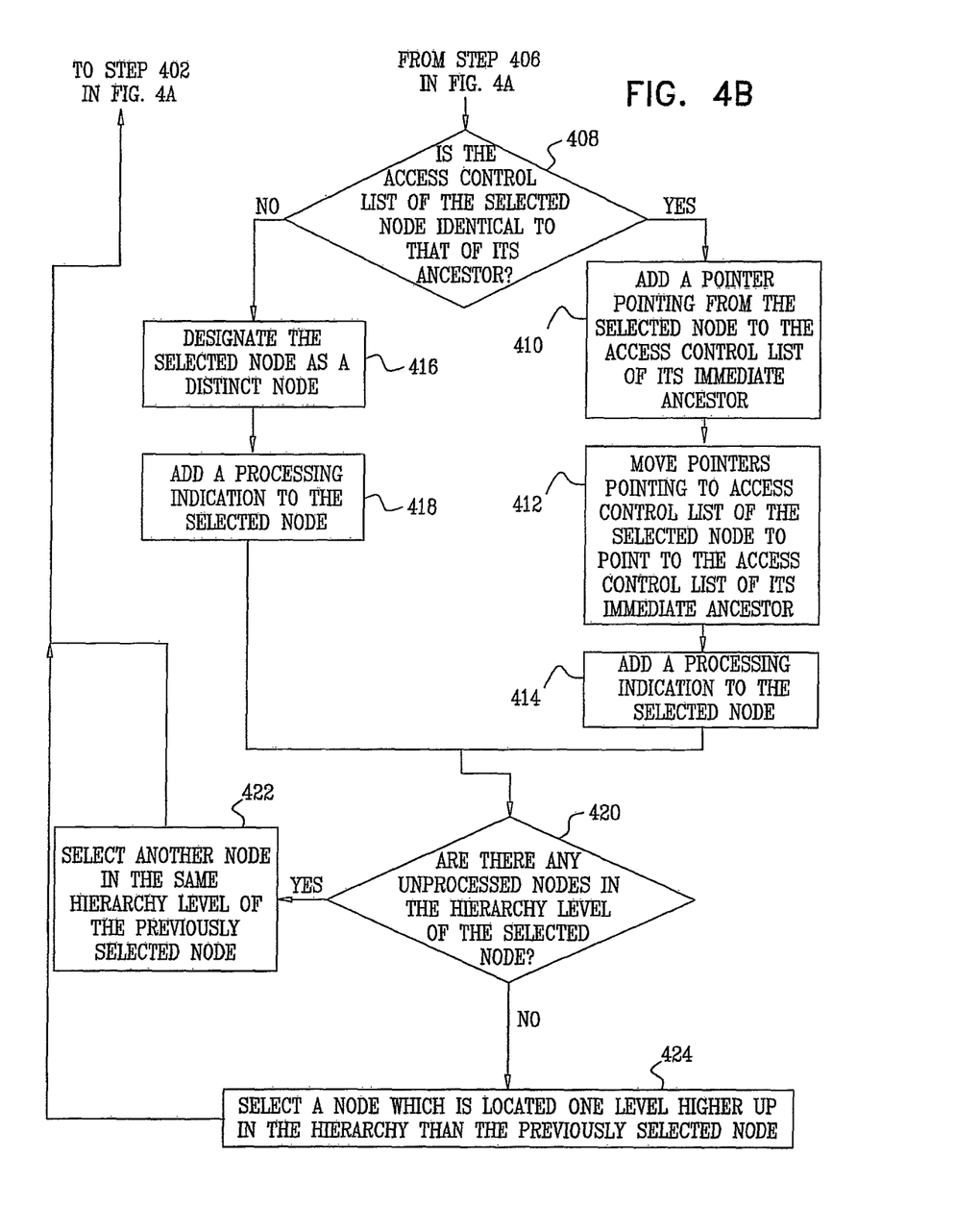

Reference is now made to FIGS. 4A and 4B, which, taken together, are a simplified flowchart illustrating methodology for grouping computer resources in a large organization based on access permissions to the computer resources, which methodology constitutes the second preparatory stage 202 of the methodology of FIG. 2.

As seen in FIG. 4A, a node of the computer resource hierarchy is selected for processing, as seen at step 400. Preferably, the computer resource hierarchy is processed from the leaves to the root, in which case the first nodes selected for processing are the leaves, or nodes at the lowest level of the computer resource hierarchy.

For the selected node, the existence of an immediate ancestor thereof in the hierarchy is checked, as seen at decision step 402. If the selected node does not have an immediate ancestor, it is deduced to be the root of the hierarchy. The node is designated as a distinct node as seen at step 404, and the process is finished. Otherwise, the access control list of the node is extracted as seen at step 405, and the access control list of the immediate ancestor of the selected node is extracted as seen at step 406. The access control lists of the selected node and of its immediate ancestor are subsequently compared, as seen at decision step 408.

It is appreciated that if no explicit access control list is associated with the node being processed, the node being processed inherits the access control list associated with the immediate ancestor node and the process continues with step 410.

Turning to FIG. 4B, it is seen that if the access control lists of the selected node and its immediate ancestor are the same, a pointer, which points from the selected node to the access control list of its immediate ancestor is added to the hierarchy, as seen at step 410. Additionally, all pointers pointing to the access control list of the selected node are moved to point to the access control list of the immediate ancestor of the selected node, as seen at step 412, and a processing indication, indicating that the node has been processed, is added to the selected node, as seen at step 414.

If the access control list of the selected node differs from that of its immediate ancestor, the node is designated as a distinct node as seen at step 416, and a processing indication, indicating that the node has been processed, is added to the selected node, as seen at step 418.

Subsequently, the level of the hierarchy to which the selected node belongs is reviewed in order to determine if there are any unprocessed nodes at that level, as seen at decision step 420. If there are any unprocessed nodes at the level of the selected node, a new node at that level is selected as seen at step 422, and the processing of that node proceeds as described hereinabove with reference to steps 402-418. Otherwise, a node which is located one level higher in the hierarchy than the selected node, such as the immediate ancestor of the selected node, is selected, as seen at step 424, and the processing thereof proceeds as described hereinabove with reference to steps 402-418.

Figure 5A:
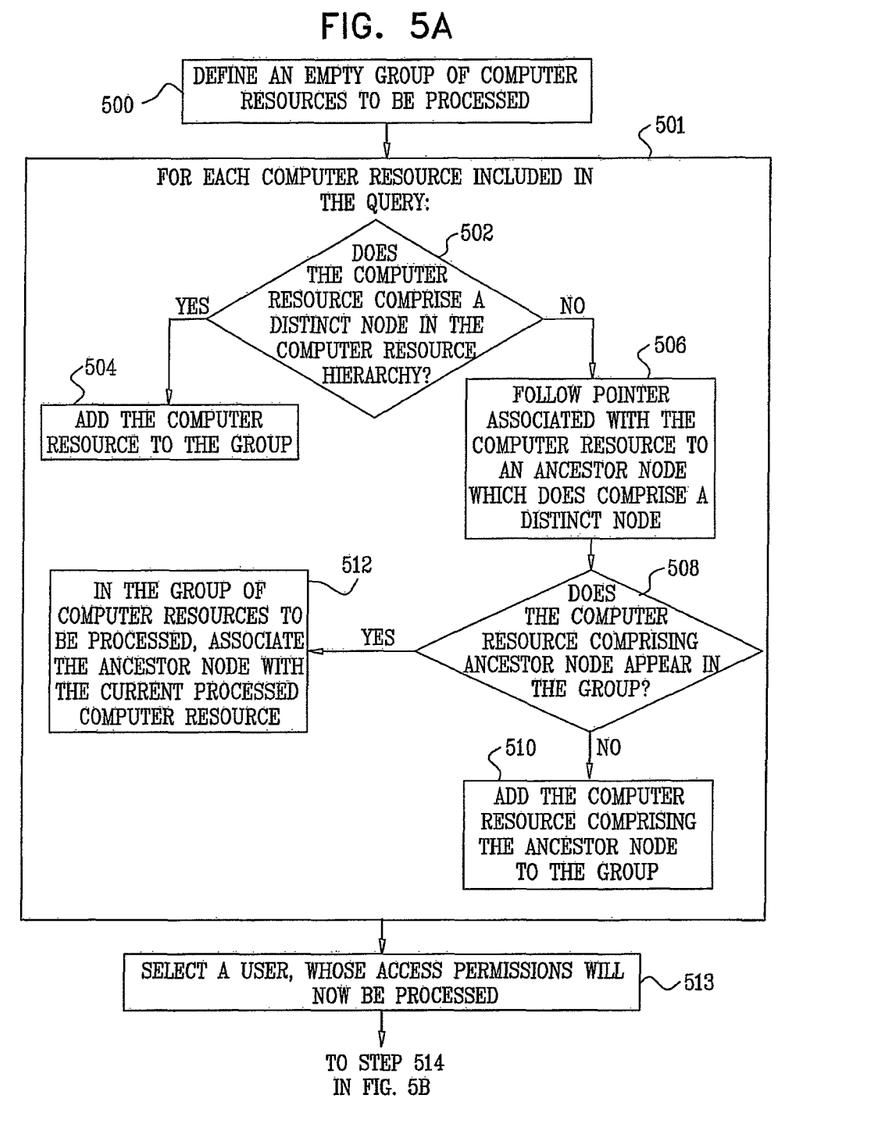
FIGS. 5A, 5B and 5C, taken together, are a simplified flowchart illustrating methodology for computing a response to an access permissions query, which methodology forms part of the methodology of FIG. 2.
Figure 5B:
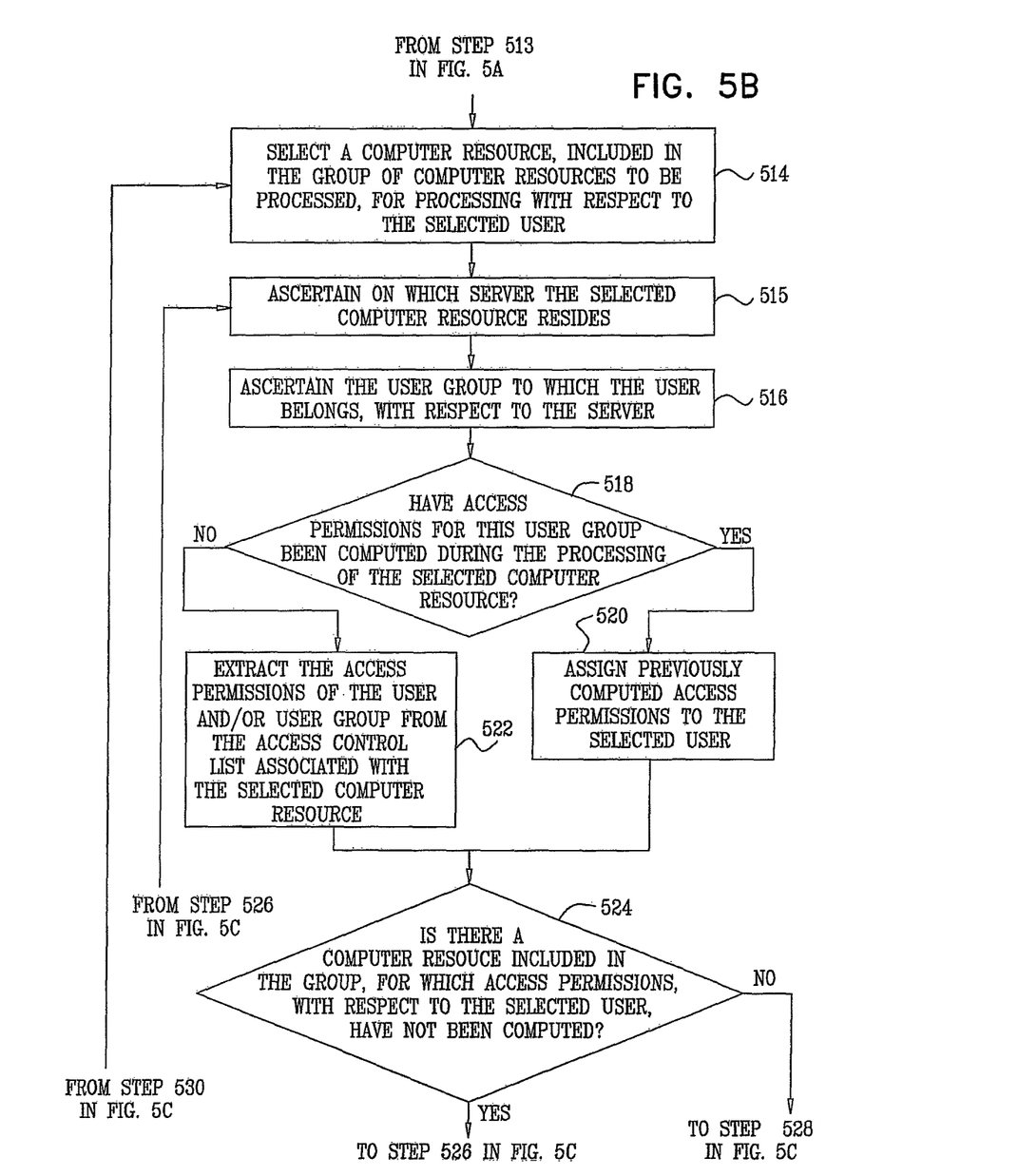
Figure 5C:
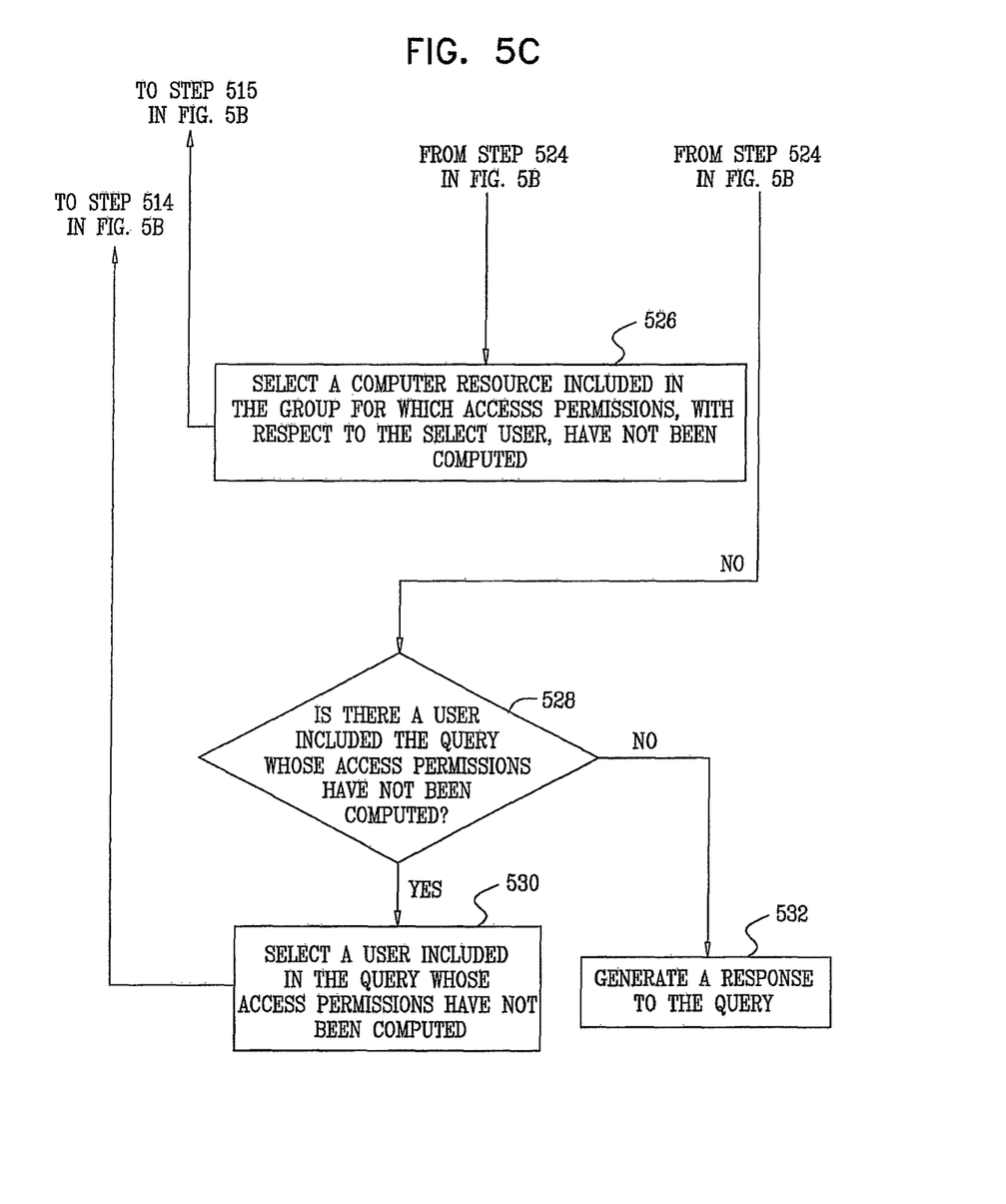

Reference is now made to FIGS. 5A, 5B and 5C, which, taken together, are a simplified flowchart illustrating methodology for computing a response to an access permissions query, which methodology constitutes step 206 of the methodology of FIG. 2.

As seen in FIG. 5A, a group of computer resources to be processed is defined, as seen at step 500. When beginning to process a query the group is typically empty and is populated during the processing of the query.

As seen in FIG. 5A, step 501 is performed for each computer resource included in the query, to detect all of the distinct computer resource nodes included in the query.

As seen in step 502, for each computer resource included in the query, it is detected whether it comprises a distinct node of the computer resource hierarchy.

If the computer resource does comprise a distinct node of the computer resource hierarchy, it is added to the group of computer resources to be processed, as seen at step 504. If the computer resource does not comprise a distinct node, the pointer associated therewith is followed to an ancestor node that comprises a distinct node, as seen at step 506.

At decision step 508, it is established if the computer resource comprising the ancestor node that comprises a distinct node has been previously added to the group of computer resources to be processed. If the computer resource comprising the ancestor node has been not previously added to the group of computer resources to be processed, it is now added to the group, as seen at step 510. If the computer resource comprising the ancestor node has been previously added to the group of computer resources to be processed, it is not added to the group a second time, but is associated, in the group of computer resources to be processed, with the currently processed computer resource, in order to enable the provision of a complete query response, as seen at step 512. This is typically achieved by defining a pointer which points from the currently processed computer resource to the instance of the distinct ancestor which is included in the group of computer resources to be processed.

As seen at step 513, a user included in the query, whose access permissions will now be processed, is selected.

Turning to FIG. 5B, it is seen at step 514 that a computer resource, which is included in the group of resources to be processed, is selected, and the physical server on which it resides is ascertained, as seen at step 515. Subsequently, the specific user group to which the user belongs, with respect to the server on which the computer resource resides, is ascertained as seen at step 516. It is then checked whether, during the processing of this computer resource, the access permissions of another user belonging to the same specific user group have been computed, as seen at decision step 518.

If the access permissions of another user, belonging to the same specific user group, to the given computer resource have been previously computed, the computed access permissions are assigned to the present user, as seen at step 520. Otherwise, the access permissions of the user, and/or of the user group to which the user belongs, to the computer resource, are extracted from the access control list associated with the computer resource, as seen at step 522.

The existence of any computer resources included in the group which have not been processed with respect to the selected user is subsequently checked, as seen at decision step 524.

As seen in FIG. 5C, if such a computer resource exists, that computer resource is selected, as seen at step 526, and is processed with respect to the selected user as described hereinabove with reference to steps 515 to 522. If no such computer resource exists, it is checked whether there are any users included in the query whose access permissions have not yet been computed, as seen at decision step 528. If such a user exists, that user is selected, as seen at step 530, and processing of access permissions thereof proceeds as described hereinabove with reference to steps 514 to 522.

As seen at step 532, when the access permissions for all of the users in the query have been computed with respect to each of the computer resources included in the group of computer resources to be processed, a response to the query, which comprises a paired list including a pair for each user and each computer resource included in the original query, is generated. It is appreciated that when generating such a query response, the results for each computer resource which comprises a distinct node ancestor for more than one of the computer resources included in the query are provided multiple times, in order to provide a query response for each computer resource included in the query.

It will be appreciated by persons skilled in the art that the invention is not limited to what has been particularly shown and described hereinabove. Rather the scope of the invention includes both combinations and subcombinations of various features described hereinabove as well as modifications of such features which would occur to a person of ordinary skill in the art upon reading the foregoing description and which are not in the prior art.

The invention claimed is:

1. In an enterprise computer system including multiple servers and multiple storage units, a method for ascertaining access permissions of users to computer resources on at least one storage unit of said multiple storage units, the method comprising employing a non-transitory, tangible computer-readable medium in which computer program instructions are stored, which instructions, when read by at least one of said multiple servers, cause said at least one of said multiple servers to:

periodically, at regular intervals of time, cluster users having at least partially identical user/resource access permissions to said computer resources, into a multiplicity of user clusters;

periodically, at regular intervals of time, cluster said computer resources having at least partially identical resource/user access permissions thereto into a multiplicity of resource clusters which are independent of said user clusters;

in response to a query received via one of said multiple servers as to whether a multiplicity of users have access permissions to a multiplicity of resources:

ascertain whether a first user of said multiplicity of users has user/resource access permissions to a first resource of said multiplicity of resources;

ascertain whether said first user is a member of a first user cluster;

ascertain whether second users of said multiplicity of users are members of said first user cluster;

ascertain whether said first resource is a member of a first resource cluster;

ascertain whether second resources of said multiplicity of resources are members of said first resource cluster; and if:

said first user has user/resource access permissions to said first resource of said multiplicity of resources; and said first user is a member of said first user cluster; and said second users are members of said first user cluster; and said first resource is a member of said first resource cluster; and said second resources are members of said first resource cluster, then:

respond to said query by stating that said first and second users have said user/resource access permissions to said first and second resources:

without checking if said first user has user/resource access permissions to said second resources; and without checking if said second users have user/resource access permissions to said second resources.

2. A method according to claim 1 and wherein said periodically cluster users comprises causing said at least one of said multiple servers to:

identify a set of user security groups, each of said user security groups having access permissions to at least one of said computer resources on said at least one storage unit of said multiple storage units;

identify, for each user of said multiplicity of users, a subset of said user security groups of which said user is a member; and if a first subset of said user security groups, of which said user of said multiplicity of users is a member, is identical to a second subset of said user security groups, of which a different user of said multiplicity of users is a member, cluster said user and said different user in a first cluster with respect to said at least one storage unit of said multiple storage units.

3. A method according to claim 1 and wherein said periodically cluster users comprises causing said at least one of said multiple servers to divide said computer resources into at least two portions, and cluster said users, among said multiplicity of users, into a first cluster wherein all members of said first cluster have at least partially identical user/resource access permissions to computer resources included in one of said at least two portions.

4. A method according to claim 1 and wherein said computer resources are arranged in a computer resource hierarchy.

5. A method according to claim 4 and wherein said periodically cluster resources comprises causing said at least one of said multiple servers to:

retrieve, for each resource in said computer resource hierarchy, the resource/user access permissions of said resource and the resource/user access permissions of an immediate ancestor of said resource in said computer resource hierarchy; and if said resource/user access permissions of said immediate ancestor are identical to said resource/user access permissions of said resource, cluster said resource and said immediate ancestor in a common resource cluster.

6. A method according to claim 5 and wherein said cluster said resource comprises causing said at least one of said multiple servers to:

provide a pointer from said resource to said immediate ancestor; and extend pointers which point to said resource to point to said immediate ancestor.

7. A computer product for controlling data access by users of an enterprise computer system including multiple servers and multiple storage units, the computer product including a non-transitory, tangible computer-readable medium in which computer program instructions are stored, which instructions, when read by at least one of said multiple servers, cause said at least one of said multiple servers to ascertain access permissions of users to computer resources on at least one storage unit of said multiple storage units, the product comprising:

user clustering functionality for periodically, at regular intervals of time, clustering users having at least partially identical user/resource access permissions to said computer resources on said at least one storage unit of said multiple storage units, into a multiplicity of user clusters;

computer resource clustering functionality for periodically, at regular intervals of time, clustering said computer resources having at least partially identical resource/user access permissions thereto into a multiplicity of resource clusters which are independent of said user clusters;

user access permissions ascribing functionality, in response to a query as to whether a multiplicity of users have access permissions to a multiplicity of resources, operative to:

ascertain whether a first user of said multiplicity of users has user/resource access permissions to a first resource of said multiplicity of resources;

ascertain whether said first user is a member of a first user cluster;

ascertain whether second users of said multiplicity of users are members of said first user cluster;

ascertain whether said first resource is a member of a first resource cluster;

ascertain whether second resources of said multiplicity of resources are members of said first resource cluster; and if:

said first user has user/resource access permissions to said first resource of said multiplicity of resources; and said first user is a member of said first user cluster;

said second users are members of said first user cluster; and said first resource is a member of said first resource cluster; and said second resources are members of said first resource cluster, then:

respond to said query by stating that said first and second users have said user/resource access permissions to said first and second resources:

without checking if said first user has user/resource access permissions to said second resources; and without checking if said second users have user/resource access permissions to said second resources.

8. The computer product according to claim 7 and wherein said user clustering functionality comprises:

user security group identification functionality for identifying a plurality of user security groups, each of said user security groups having access permissions to at least one of said computer resources on said at least one storage unit;

user security group subset identification functionality for identifying, for each user of said multiplicity of users, a subset of said user security groups of which said user is a member; and user subset comparison functionality for clustering said user and a different user in a first cluster, with respect to said at least one storage unit, if a first subset of said user security groups of which said user is a member is identical to a second subset of said user security groups of which said different user is a member.

9. The computer product according to claim 7 and also comprising a computer resource dividing functionality for dividing said computer resources into at least two portions, and wherein said user clustering functionality clusters users, among said multiplicity of users, into a first cluster wherein all members of said first cluster have at least partially identical user/resource access permissions to computer resources included in one of said at least two portions.

10. The computer product according to claim 9 and wherein said computer resource dividing functionality comprises:

fraction calculating functionality for calculating, for each user of said multiplicity of users, a fraction of said computer resources to which said user has access permissions, and to compare said fraction to a threshold value;

user denoting functionality for denoting each user, for whom said fraction is smaller than said threshold value, as a degenerate security group; and portion defining functionality for defining a first portion of said computer resources to be the union of all computer resources which include access permissions for any degenerate security group.

11. The computer product according to claim 7 and wherein said computer resources are arranged in a computer resource hierarchy.

12. The computer product according to claim 11 and wherein said computer resource clustering functionality comprises:

resource/user access permissions retrieval functionality for retrieving, for each resource in said computer resource hierarchy, the resource/user access permissions of said resource and the resource/user access permissions of an immediate ancestor of said resource in said computer resource hierarchy; and resource/user access permissions comparison functionality, for comparing said resource/user access permissions of said resource to said resource/user access permissions of said immediate ancestor, and if said resource/user access permissions of said immediate ancestor are identical to said resource/user access permissions of said given resource, to cluster said resource and said immediate ancestor in said a common resource cluster.

13. The computer product according to claim 12 and wherein said resource/user access permissions comparison functionality provides a pointer from said resource to said immediate ancestor and extends pointers which point to said resource to point to said immediate ancestor.

* * * * *